United States Patent [19]

Kot

[11] Patent Number: 5,930,296

[45] Date of Patent: Jul. 27, 1999

[54] LOW-COMPLEXITY BIDIRECTIONAL EQUALIZER

[75] Inventor: Alan D. Kot, Vancouver, Canada

[73] Assignee: Glenayre Electronics, Inc., Charlotte, N.C.

[21] Appl. No.: 08/824,685

[22] Filed: Apr. 8, 1997

[51] Int. Cl.⁶ .............................. H03H 7/30; H03H 7/40; H03K 5/159
[52] U.S. Cl. ............................................................ 375/233
[58] Field of Search .................................. 375/229, 230, 375/232, 233, 346, 348, 350, 285, 254; 364/724.19, 724.2, 724.011; 455/150.1, 63

[56] References Cited

U.S. PATENT DOCUMENTS

| | | | |
|---|---|---|---|
| 3,619,789 | 11/1971 | De Jager | 325/480 |
| 4,003,006 | 1/1977 | Mandeville et al. | 333/16 |
| 4,228,517 | 10/1980 | Constant | 364/724 |
| 4,538,283 | 8/1985 | Hogge, Jr. . | |
| 4,597,088 | 6/1986 | Posti et al. . | |
| 5,050,186 | 9/1991 | Gurcan et al. . | |
| 5,097,482 | 3/1992 | Serizawa et al. . | |
| 5,119,401 | 6/1992 | Tsujimoto . | |
| 5,164,961 | 11/1992 | Gudmundson . | |
| 5,247,541 | 9/1993 | Nakai . | |
| 5,249,205 | 9/1993 | Chennakeshu et al. . | |
| 5,257,265 | 10/1993 | Su et al. | 370/100.1 |
| 5,267,265 | 11/1993 | Mizoguchi . | |
| 5,274,670 | 12/1993 | Serizawa et al. . | |
| 5,283,531 | 2/1994 | Serizawa et al. | 329/316 |
| 5,283,811 | 2/1994 | Chennakeshu et al. . | |
| 5,353,307 | 10/1994 | Lester et al. . | |
| 5,406,613 | 4/1995 | Peponides et al. . | |
| 5,420,884 | 5/1995 | Inoue | 375/229 |
| 5,455,844 | 10/1995 | Ishikawa et al. | 375/232 |
| 5,513,215 | 4/1996 | Marchetto et al. | 375/233 |
| 5,644,597 | 7/1997 | Ueda | 375/232 |
| 5,648,991 | 7/1997 | Namekata et al. | 375/341 |

*Primary Examiner*—Jason Chan
*Assistant Examiner*—Jean B Corrielus
*Attorney, Agent, or Firm*—Christensen O'Connor Johnson & Kindness PLLC

[57] ABSTRACT

Disclosed are bidirectional equalizer arrangements in which the outputs of the forward and reverse equalizers are combined using low complexity processing to yield a single output sequence. In each disclosed arrangement of the invention, the low complexity processing utilizes the equalizer error outputs of the forward and reverse equalizers, which are then zero-delay lowpass filtered to provide relative reliability estimates. In one arrangement of the invention, these reliability estimates are used to select, on a symbol-by-symbol basis, either the forward or the reverse equalizer output. In another arrangement of the invention, a single linear lowpass filter is used to filter the difference of the equalizer error signals. In another arrangement of the invention, the relative reliability estimates are used to form a weighted average of the forward and reverse equalizer pre-decision signals. This weighted-average complex-valued signal then acts as a new equalized signal, and is fed to a constellation decision device to form a symbol decision. The arrangements of the invention can provide the majority of the gain offered by schemes that optimally (in a maximum-likelihood sense) consider all possible sequences formed from the bidirectional equalizers, while avoiding the optimal scheme's complexity which exhibits an exponential dependence on the duration of the channel impulse response.

17 Claims, 8 Drawing Sheets

LOW-COMPLEXITY BIDIRECTIONAL EQUALIZER

FIELD OF THE INVENTION

This invention relates to methods and apparatus for adaptive signal equalization in communication systems that are subject to intersymbol interference along with multipath fading and/or other dynamic changes in transmitter to receiver channel characteristics. More specifically, this invention relates to methods and apparatus for bidirectional equalization in communication systems employing periodic bursts of equalizer training symbols.

BACKGROUND OF THE INVENTION

Communication system receivers frequently operate in the presence of intersymbol interference and additive noise. One example is simulcast communications systems, which employ a plurality of transmitters (base stations) that simultaneously transmit an identical message to a mobile receiver, which can result in the reception of two or more signals that typically are not in time alignment. That is, the propagation delays from the transmitters are typically unequal, giving rise to intersymbol interference.

Independent of the intersymbol interference caused by simulcast transmission, intersymbol interference can also be caused by multipath propagation. Multipath propagation arises from multiple reflections of signals from buildings or other objects and can lead to intersymbol interference if the delay spread of its received signals is significant compared to the symbol duration. Multipath propagation also causes signal fading which occurs as a mobile receiver travels through the interference pattern that results from the superposition of multiple signals.

Further, in simulcast systems, although substantial effort is devoted to ensuring that the transmitters operate at identical frequencies and are synchronized with one another, some mismatches still exist. These mismatches result in additional signal degradation. For example, some simulcast transmitters in current commercial operation maintain the timing error between base stations to within ±10 microseconds. Consequently, a receiver that is located in an overlap region encounters a worst-case RF signal delay on the order of 20 microseconds, (due to base station timing error) plus roughly 50 microseconds (due to the propagation time differences).

The earliest approach to deal with the relative delay between multiple receive signals was simply to restrict the system signaling rate. In the referenced example of a simulcast system with a worst case delay spread of 70 microseconds, in the past, the signaling rate has been restricted to approximately 3500 baud. This restriction kept the delay spread to less than ¼ symbol, as a crude "rule of thumb."

More recently, the signaling rate has been increased, with the intersymbol interference being handled by adaptive equalization techniques. Various adaptive equalizers exist, including Decision Feedback Equalizers (DFEs) and Maximum Likelihood Sequence Estimators (MLSEs). U.S. Pat. No. 5,353,307, and other publications disclose adaptive equalizers for simulcast receivers that employ Lattice-DFE and Kalman-DFE techniques. Hybrid arrangements that combine various equalization techniques have also been proposed.

In general, each prior adaptive equalization proposal exhibits both advantages and drawbacks. For example, DFE arrangements are advantageous in that they exhibit low computational complexity, but are disadvantageous because of an undesirably high bit error rate (BER). In contrast, the BER of MLSE arrangements can be low, but at the cost of a large computational complexity, which grows exponentially as a function of channel memory length (i.e., the number of significant taps in the channel impulse response).

To increase the effectiveness of equalization, communication systems have been developed in which a periodically transmitted sequence of reference (training) symbols is interspersed with data symbol sequences. The sequence of training symbols is known to the receiver and is utilized to update the equalizer taps. More specifically, the training symbols are used to update the equalizer taps so that the correspondence between the equalizer and the channel impulse response is accurate to the degree possible with the particular equalizer memory length.

The use of training symbols can serve to make equalizer tracking more robust to fading. However, there is a cost in terms of loss of data transmission capacity, since time and signal energy are expended to transmit the training sequences. Consequently, there is a trade-off between the cost of providing training symbols and their benefit of improving the tracking ability of the equalizer.

Bidirectional equalization techniques have been proposed that serve to improve equalizer performance, given any particular amount of training symbol overhead. In bidirectional equalization, the symbol processing is carried out in the normal temporal sequence (forward equalization), and in reverse time order (reverse equalization). The forward and reverse equalizers may both process an entire block of data symbols, or only mutually exclusive portions. In the former case, various approaches have been used for the selection of the forward or reverse equalizer signals, including selection on a symbol-by-symbol basis, and selection of either the forward or reverse equalizer signals for an entire data block.

One prior art bidirectional DFE arrangement is disclosed in "A Soft-Output Bidirectional Decision Feedback Equalization Technique for TDMA Cellular Radio," which is authored by Liu et al., and was published in *IEEE Journal on Selected Areas in Communications*, Vol. 11, No. 7 (September 1993). In the equalization process disclosed by Liu et al., equalization in the forward and reverse directions are used to identify the onset of a deep signal fade with respect to each processing direction. When a deep fade is identified in either direction, equalization in that direction ceases and processing is initiated in the opposite direction until a deep fade is again identified. With respect to data time slots in which a single deep fade occurs, the process of Liu et al. thus provides relatively reliable equalization for all received symbols, except those received during the deep fade period. To minimize equalization errors during the deep fade period, the arrangement of Liu et al. uses forward equalization for the first half of the detected deep fade, and uses reverse equalization for the second half of the deep fade period.

U.S. Pat. No. 5,274,670, which issued to Serizawa et al. on Dec. 28, 1993, discloses bidirectional DFE arrangements which utilize "evaluation functions" that are intended to estimate the reliability of the forward and reverse equalizers. In one arrangement of Serizawa et al., the forward evaluation function is a lowpass filtered version of a correlation of the signal sequence with a sequence produced by the forward equalizer. The evaluation function for the reverse equalization is similarly obtained using the output of the reverse equalizer. The output of this arrangement is produced by a bit-by-bit comparison of the forward and reverse evaluation functions with the data symbol exhibiting the highest correlation value being included in the output sequence.

Additional bidirectional DFE arrangements that are proposed by Serizawa et al., include modifications of the evaluation functions to attempt to increase the accuracy of the reliability estimate. Such modifications include multiplication or addition of "correction" functions, which bias the reliability estimates to be stronger for those bits nearest the training bits. In yet another proposal of Serizawa et al., equalization switches from forward equalization to reverse equalization when the sum of absolute values of the DFE feed forward taps drops below a predetermined, near-zero value.

U.S. Pat. No. 5,513,215, which issued to Marchetto et al. is entitled "HIGH SPEED SIMULCAST DATA SYSTEM USING ADAPTIVE COMPENSATION," and is assigned to the assignee of this application, discloses a two-stage equalizer that is driven by a channel impulse response estimator. The first equalizer stage is a bidirectional DFE. The forward and reverse DFE outputs are provided as inputs to a Viterbi equalizer as tentative data sequence estimates. In effect, the Viterbi equalizer is thus constrained to consider all sequences that are made up of different combinations of the forward and reverse DFE output signals. Constraining the Viterbi equalizer in this manner dramatically reduces the prohibitive computational effort of an unconstrained Viterbi equalizer.

In many situations, the currently proposed bidirectional DFE arrangements provide satisfactory BER performance. Although the arrangement disclosed in the above-referenced U.S. patent application of Marchetto et al. provides significant performance improvement over prior art equalization techniques, the use of the constrained Viterbi equalizer can result in computational complexity that is undesirable or, in some situations, prohibitive. For example, one realization of the constrained Viterbi equalizer proposed by Marchetto et al. exhibits a peak complexity of approximately 76 million instructions per second (MIPS), which accounts for approximately 70% of the peak computational work-load of the complete receiving system. Moreover, the peak workload required by the Marchetto et al. bidirectional DFE increases exponentially with the symbol rate.

The arrangement disclosed in the above-referenced patent of Serizawa et al. can be simpler than the method of Marchetto et al. However, the computation of each evaluation function is still rather complex, primarily since it involves a correlation computation (of length on the order of the number of equalizer taps).

SUMMARY OF THE INVENTION

The bidirectional equalizer arrangement of this invention greatly reduces the implementation complexity relative to the approach of Marchetto et al. in U.S. Pat. No. 5,513,215, without unduly increasing the system BER. For example, with respect to a typical system configuration, the invention reduces the peak work load for the processing of the forward and reverse DFE outputs from 76 million instructions per second (MIPS) to less than 0.07 MIPS. Moreover, in accordance with the invention, the computational requirements of the equalizer do not increase with increasing symbol rate, whereas the computation requirements of the Marchetto et al. approach increases exponentially with symbol rate. Despite a marked decrease in computational requirements, the invention exhibits a modest performance penalty relative to the above-discussed proposal of Marchetto et al. From simulation of a variety of system configurations, the invention achieved between approximately 70% and 90% of the bit error rate reduction that can be obtained using the arrangement of Marchetto et al. relative to single direction equalization. Further, in an additional embodiment of the invention, a modest improvement in error rate reduction can be obtained at a computational cost of approximately 0.4 MIPS.

The bidirectional equalizer arrangement of this invention also reduces implementation complexity relative to the approach of Serizawa et al. The primary reduction in computation arises from not having to perform the correlation computation required for the evaluation functions of Serizawa et al.

In each disclosed embodiment of the invention, the error signals provided by forward and reverse equalizers are exploited to provide symbol reliability metrics. In one realization of the invention, the error signals produced by forward and reverse decision feedback equalizers (DFEs) are separately processed by zero-delay lowpass filters to reduce inaccuracies in the estimated reliabilities that are caused by DFE decision errors. Using zero-delay lowpass filters retains the time correspondence between the error signals and the signal estimates produced by the respective DFEs while simultaneously improving accuracy of the reliability estimates. In this embodiment, the separately filtered error signals are compared with one another; with the DFE output symbol that corresponds to the lowest value filtered error signal being selected as the equalizer output.

While various non-linear lowpass filters can be employed, if linear filtering is used, it is not necessary to separately filter the forward and reverse DFE error signals. In this case the forward and reverse DFE error signals can be combined to produce a difference signal, with the difference signal being processed by a single zero-phase lowpass filter. The sign of the output of this single filter is then used to select, on a symbol-by-symbol basis, either the signal produced by the forward DFE or the reverse DFE.

An additional embodiment of the invention differs from the above-discussed arrangement in that the filtered forward and reverse DFE error signals are not used to select between the output sample supplied by the forward DFE and the output signal supplied by the reverse DFE. Instead, in this additional embodiment, an intermediate signal of the forward and reverse DFEs that is known as the "equalized sample" (i.e., the signal just prior to the DFE decision block); and the forward and reverse DFE error signals are used to determine a new signal estimate. In this embodiment, a new equalized sample (signal estimate) is produced by: (1) determining a scaling (relative reliability) factor that is equal to $\bar{e}_f/(\bar{e}_f+\bar{e}_r)$, where $\bar{e}_f$ and $\bar{e}_r$ respectively indicate the lowpass filtered forward and reverse DFE error signals; (2) using the scaling factor to multiply a vector quantity equal to $(y_f-y_r)$, where $y_f$ and $y_r$ respectively indicate the complex baseband equalized samples of the forward and reverse DFEs; and, (3) summing the product obtained in step (2) with the vector $y_f$ to provide the new signal estimate. It will be noted that the scaling factor (relative reliability term) is less than or equal to unity, and that the signal estimate provided by the second embodiment will be between the forward and reverse equalized samples ($y_f$ and $y_r$); being close to $y_f$ when the scaling factor is small (corresponding to the relative reliability of the reverse equalizer being small), and being close to the reverse equalized sample $y_r$ when the scaling factor is nearer to unity (corresponding to the relative reliability of the reverse equalizer being large).

BRIEF DESCRIPTION OF THE DRAWINGS

The foregoing aspects and many of the attendant advantages of this invention will become more readily appreciated by reference to the following detailed description, and accompanying drawings, wherein.

DETAILED DESCRIPTION

Figure 1:
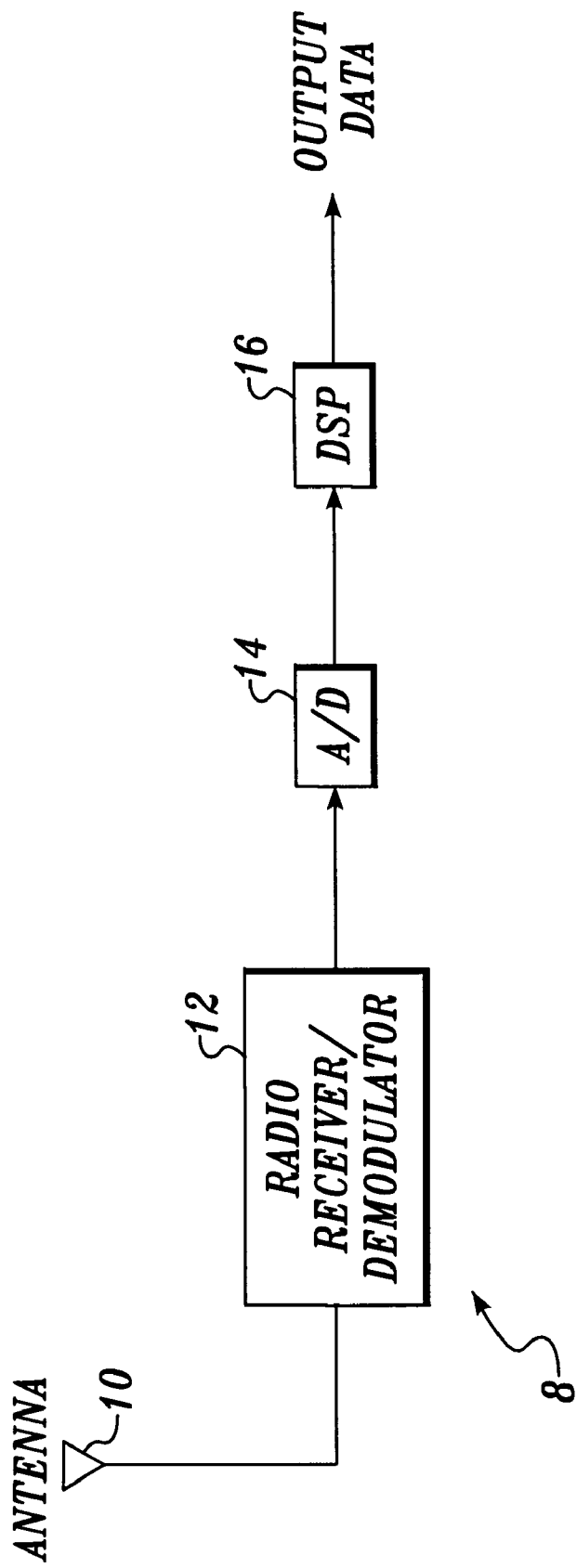
FIG. 1 a simplified block diagram of a common receiver architecture used in modem communication systems, and which can advantageously employ the present invention.

FIG. 1 is a block diagram depicting the general structure of a common type of receiver in which the invention is practiced. In the arrangement of FIG. 1, an antenna 10 supplies received RF signals to a radio receiver/demodulator circuit 12. Various conventional arrangements can be used for radio receiver/demodulator circuit 12 to down-convert the received signal, typically to complex-baseband. The down-converted signal that is supplied by radio receiver/demodulator is coupled to an analog-to-digital converter 14, which produces a digitized signal that is supplied to a digital signal processor (DSP) 16. DSP 16 is a program-controlled device that executes various signal processing routines.

Figure 2:
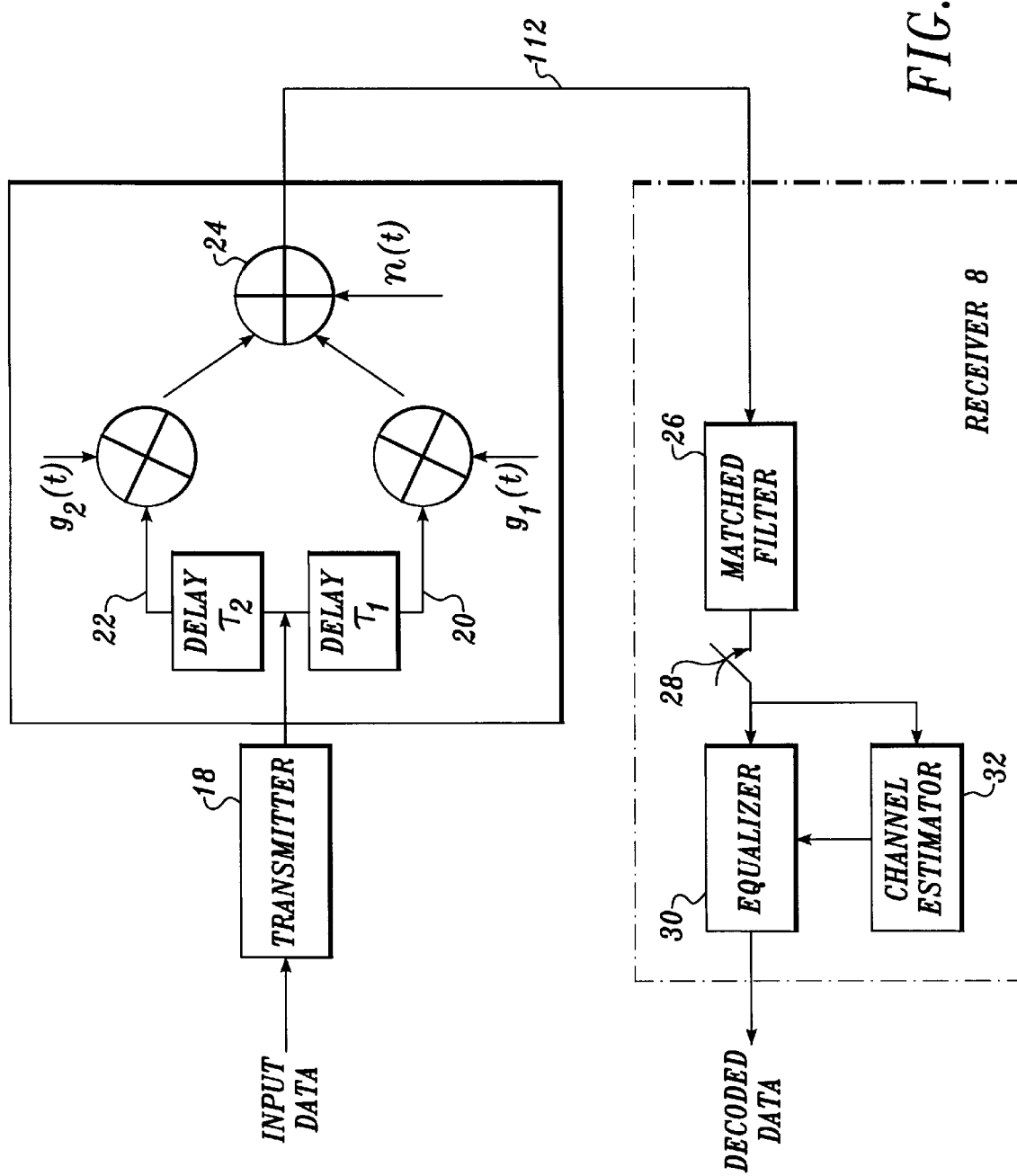
FIG. 2 illustrates a simplified model of a communication system with multipath propagation and includes a block diagram of a type of receiver that can advantageously employ the invention.

FIG. 2 is a block diagram representation that illustrates the form of the receiver that can advantageously employ the invention. In addition, the block diagram of FIG. 2 provides a simplified baseband model of radio propagation in which the radio channel is modeled as having a number of paths, with each path having an associated delay and complex gain. It should be noted that the number of paths may vary randomly, as may the gains and delays. In the base band channel model of FIG. 2, a plurality of transmission paths 20-1, 20-2, . . . , 20-n are shown with each path modeled as having independent flat Rayleigh fading. As is symbolically indicated in FIG. 2, each of the transmission paths 20-1, 20-2, . . . , 20-n subject the transmitted signal to a time delay $\tau_1, \tau_2, \ldots, \tau_n$, respectively.

Insimulcast communication systems it can occur that multiple propagation paths arise from both the multiple transmitters and multiple reflections. The time varying signal fading, which varies in degree relative to various transmission media and transmission paths within a media, can cause additional significant degradation of the signal. For simplicity, the transmission channel model of FIG. 2 is often taken to have each path undergoing independent Rayleigh flat fading, with the introduction of additive white Gaussian noise.

Turning to the portion of FIG. 2 that illustrates functional aspects of receiver 8, the receive signal is filtered by a matched filter 26. The signal supplied by matched filter 26 is periodically sampled at a node 28 (e.g., processed by analog-to-digital converter 14 of FIG. 1) to produce digitized signals that are supplied to an equalizer 30 and a channel estimator 32. Channel estimator 32 periodically provides an estimate of the channel impulse response which is used to update the signal processing parameters of equalizer 30. Operating in conjunction, equalizer 30 and channel estimator 32 provide compensation for dynamically changing channel conditions so that receiver 8 produces decoded data that substantially correspond to the originally transmitted data.

Channel estimator 32 can be realized by various signal processing techniques and arrangements. For example, the currently preferred embodiments of the invention are used in receivers that decode a signal in which sequences of one or more training (pilot) symbols that are periodically interspersed with data symbols to define blocks of data that convey a transmitted message. In these currently preferred embodiments, the channel impulse response estimate is periodically derived from each received sequence of pilot symbols. Interpolation of the channel impulse response can be employed during the blocks. Additional detail relating to the channel impulse response estimation that can be employed in this invention can be obtained from U.S. Pat. No. 5,414,734, which issued on May 9, 1995, and is entitled "COMPENSATION FOR MULTI-PATH INTERFERENCE USING PILOT SYMBOLS."

Figure 3:
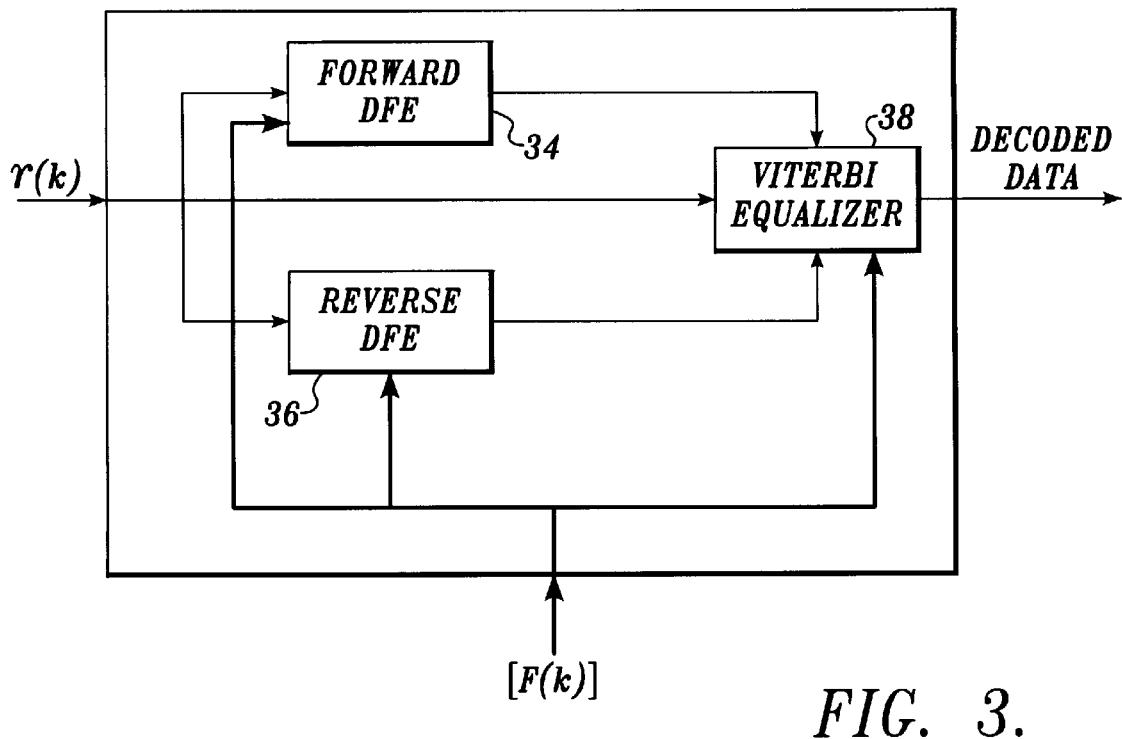
FIG. 3 depicts a bidirectional decision feedback equalizer in which a Viterbi equalizer selects the output of the forward decision feedback equalizer or the reverse decision feedback equalizer and supplies the selected output as the output of the equalizer.

FIG. 3 is a block diagram of an example of a bidirectional decision feedback equalizer that was developed for use in a receiver of the above-discussed type (i.e., receiver 8 of FIG. 2). The equalizer shown in FIG. 3 is disclosed in U.S. Pat. No. 5,513,215, issued Apr. 30, 1996, entitled "HIGH SPEED SIMULCAST DATA SYSTEM USING ADAPTIVE COMPENSATION," and is assigned to the assignee of this invention.

In the arrangement of FIG. 3, each signal sample r(k) that is supplied by analog-to-digital converter 14 of FIG. 1 is processed by a forward DFE 34 and by a reverse DFE 36. In addition, the received signal samples r(k) are supplied to a Viterbi equalizer 38, which receives the signal estimates generated by forward DFE 34 and reverse DFE 36. The channel impulse response estimate [F(k)], which is supplied by channel estimator 32 of FIG. 2, is provided to forward DFE 34 and reverse DFE 36 for updating the equalization parameters (tap values) of the respective equalizers. In addition, the channel impulse response estimate [F(k)] is supplied to the Viterbi equalizer 38.

Figure 4:
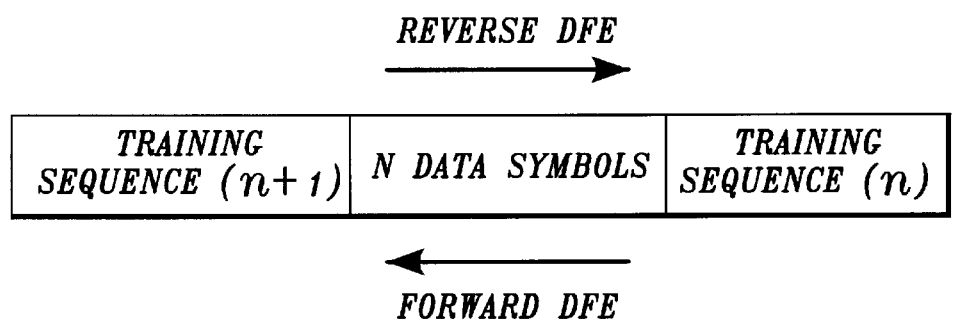
FIG. 4 depicts the frame format of the transmitter and shows training symbol blocks and data symbol blocks. Such a frame format can be received and decoded by various means, including the present invention and the bidirectional decision feedback equalizer arrangement of FIG. 3.

The equalizer shown in FIG. 3 is a hybrid arrangement that includes two stages of equalization. In operation, forward DFE 34 and reverse DFE 36 perform signal processing associated with the first stage of equalization, with each of the DFEs supplying a sequence of tentative equalized data symbols to Viterbi equalizer 36 (the second stage of the equalizer). In doing so, forward DFE 34 and reverse DFE 36 operate in the manner indicated in FIG. 4. Specifically, forward DFE 34 processes a data block in the sequence supplied by analog-to-digital converter 14 of FIG. 1, while the reverse DFE 36 processes a data block in reverse time order.

Viterbi equalizer 38 of FIG. 3 provides an optimal strategy for selecting a most likely estimate sequence, given that it is constrained to consider all possible combinations of the forward and reverse DFE outputs. However, a bidirectional decision feedback equalizer of the type shown in FIG. 3 presents a signal processing workload that can be undesirably high in some system arrangements. For example, one realization of the equalizer shown in FIG. 3 exhibits a peak complexity of approximately 76 MIPS (millions of instructions per second).

Figure 5:
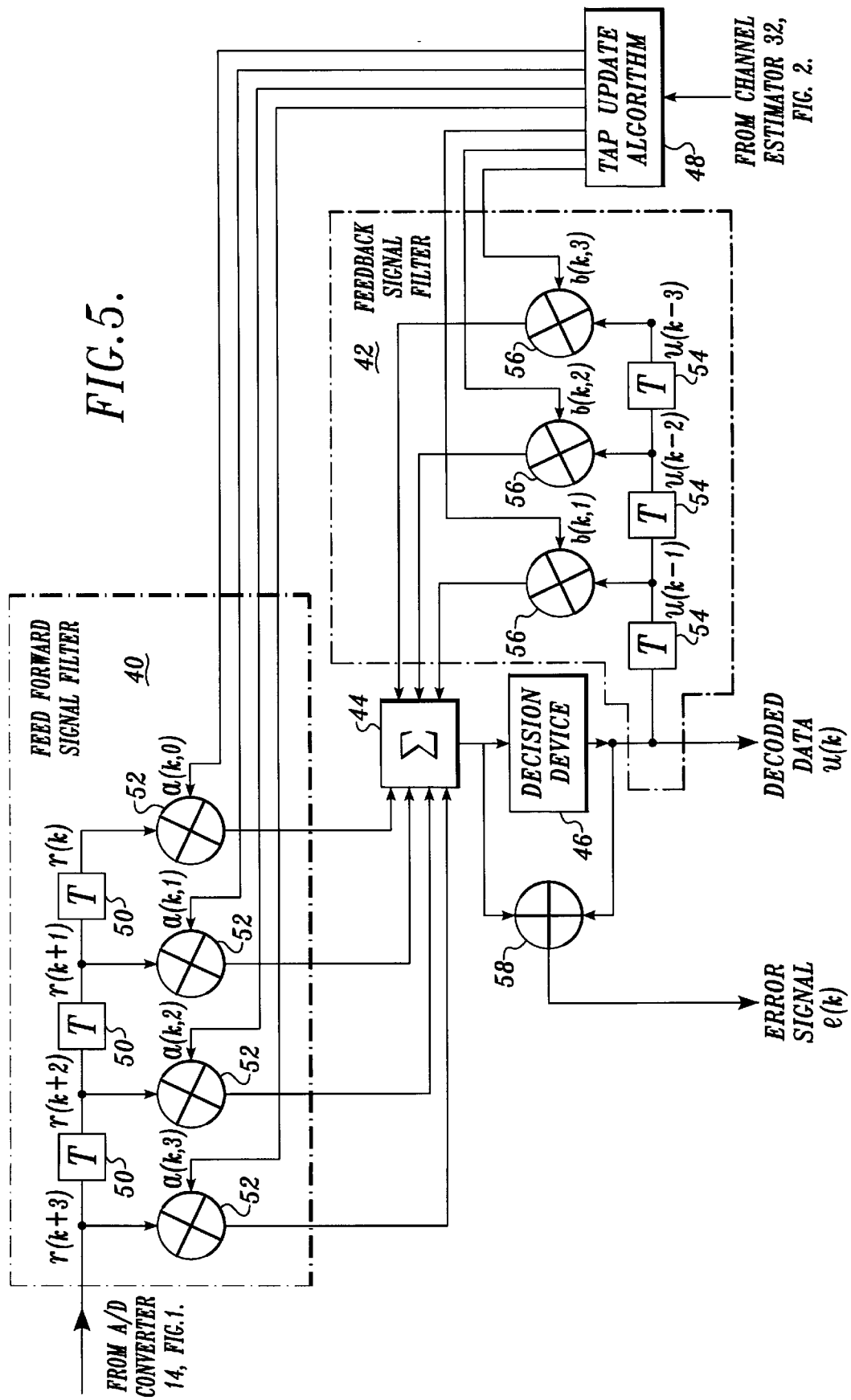
FIG. 5 is a block diagram representation of a channel estimator driven decision feedback equalizer that can be employed as the forward and reverse decision feedback equalizers in either the arrangement of FIG. 3 or various embodiments of this invention.

FIG. 5 is a block diagram of a decision feedback equalizer that is suitable for use as forward DFE 34 of FIG. 3, reverse DFE 36 of FIG. 3 and the bidirectional equalizers of the present invention. The arrangement of FIG. 5 is representative of well-known DFEs, and includes a forward signal filter 40, a feedback signal filter 42, a summation unit 44, a decision device 46 and a tap update algorithm 48.

Decision device 46 processes the signal y(k), which we will refer to as the "equalized signal," to produce an output signal u(k) that minimizes the Euclidean distance between u(k) and a symbol of the signal used. Although various minimization criteria can be employed, current decision feedback equalizers typically used mean squared error minimization techniques.

Ideally, the mean squared error of a decision feedback equalizer approaches zero (i.e., if a sufficient number of training symbols are available, a sufficient number of feed forward and feedback taps are used, and the tap update algorithm is sufficiently precise). In practice, the mean squared DFE error does not converge to zero and often is used to improve various aspects of system performance. For example, in many systems that employ decision feedback equalizers, the DFE error signal is used to improve performance of the channel estimator (or the update algorithm). In other arrangements, the DFE error signal is used as an estimate of how well the equalizer tracks channel fading. In the arrangement of FIG. 5, an error signal e(k), equal to the magnitude of the difference between the decoded symbol u(k) and the equalized signal y(k), is supplied by summing unit 48 for use in the present invention in the manner discussed below.

Figure 6:
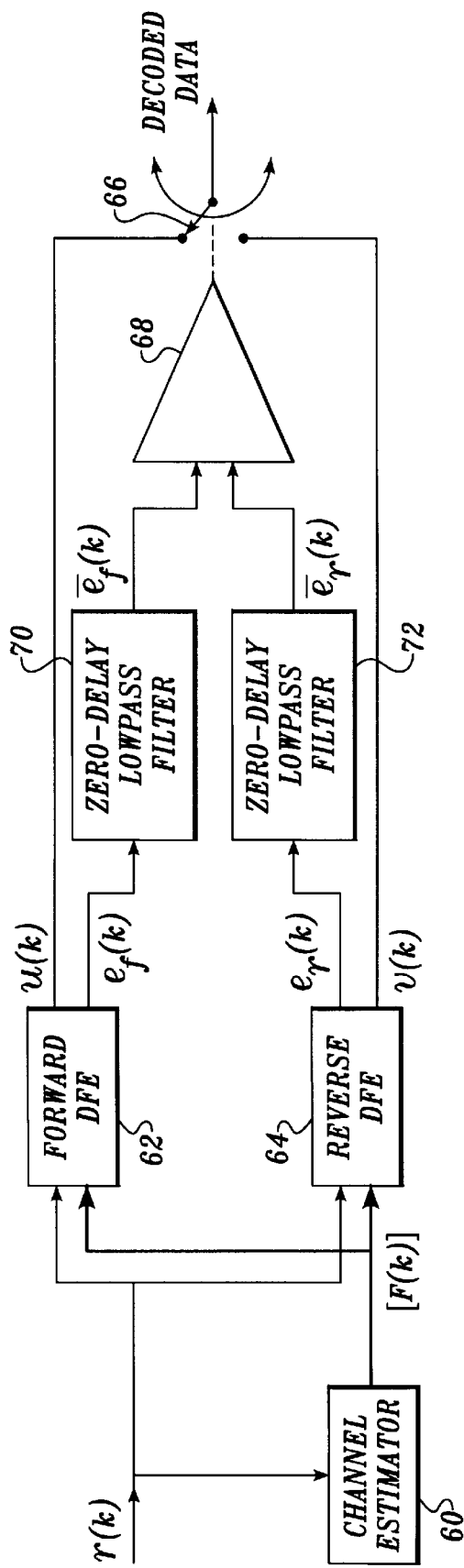
FIG. 6 illustrates a first embodiment of a bidirectional equalizer in accordance with this invention wherein error signals supplied by forward and reverse decision feedback equalizers of the type shown in FIG. 5 are individually lowpass filtered and then compared to select either the signal estimate provided by the forward decision feedback equalizer or the signal estimate supplied by the reverse feedback equalizer as the equalized output of the invention.

FIG. 6 depicts a first embodiment of a bidirectional DFE arrangement of this invention, which significantly reduces the implementation complexity relative to the arrangement of FIG. 3 with a tradeoff of a somewhat increased BER. The arrangement of FIG. 6 is identical to the arrangement of FIG. 3 in that signal samples r(k) are supplied to a channel estimator 60 and to forward and reverse DFEs 62 and 64. Further, as is the case in the arrangement of FIG. 3, the channel impulse response estimate [F(k)] that is supplied by channel estimator 60 is provided to both forward DFE 62 and reverse DFE 64.

The embodiment of the invention depicted in FIG. 6 differs from the arrangement of FIG. 3 in that a most likely sequence estimation algorithm with constrained inputs, e.g., Viterbi equalizer 38 of FIG. 3, is not used. In the arrangement of FIG. 6, the decoded data u(k) supplied by forward DFE 62 and the decoded data v(k) supplied by reverse DFE 64 are supplied to a selector switch 66 that is controlled by the output of comparator 68. As is indicated in FIG. 6, one input of comparator 68 is based upon the error signal $e_f(k)$ of forward DFE 62, which is first processed by a zero-delay lowpass filter 70. Similarly, the error signal $e_r(k)$ of reverse DFE 64 is lowpass filtered by a zero-delay lowpass filter 72 and supplied to the second input of comparator 68.

The signals supplied by zero-delay lowpass filters 70 and 72 are utilized as symbol reliability metrics, with the zero-delay characteristic of the filters serving to retain the time correspondence between each DFE error signal and its respective sequence of equalized symbols. Each of the lowpass filters 70 and 72 serves to improve the estimation of the DFE reliabilities, by smoothing out error signals that are deceivingly low during symbol decision errors.

Zero-delay lowpass filter functions of varying complexity can be used in the practice of the invention. In particular, it is attractive to use linear filters, in which case the embodiment of the invention depicted in FIG. 6 can be modified to use a single zero-phase lowpass filter in place of zero-delay lowpass filters 70 and 72 of FIG. 6. More specifically, when linear filtering is employed, the difference between the error signals $e_f(k)$ and $e_r(k)$ can be obtained (indicated at a summer unit 74 in FIG. 7) and filtered by a zero-phase lowpass filter (76 in FIG. 7). The signal supplied by the zero-phase lowpass filter 76 ($\bar{e}(k)$ in FIG. 7), is supplied to a slicer 78. Slicer 78 activates switch 66 to select the estimated symbol supplied by forward DFE 62 when $\bar{e}(k)$ is negative (i.e., the magnitude of $\bar{e}_r(k)$ is greater than the magnitude $\bar{e}_f(k)$). Conversely, when $\bar{e}(k)$ is greater than zero slicer 78 activates switch 66 to select the estimated symbol supplied by reverse DFE 64 as the decoded output signal of the equalizer.

When linear filtering is used, zero-phase lowpass filters of varying complexity may be considered. For example, satisfactory operation can be obtained in some cases with a very simple zero-phase lowpass filter formed by a bidirectional pass of a single-pole infinite impulse response (IIR) filter of the form $$\bar{e}(k) = a\bar{e}(k-1) + e(k)$$

where a is a constant chosen to approximately minimize the BER. For example, computer simulation of 8 PSK and 16 QAM modulation with square root raised cosine pulse shaping (on a two path equal strength Rayleigh faded channel) indicates satisfactory operation of the invention for 40% signal rolloff with the constant a being set equal to 0.5 and with the constant a being set equal to 0.55 for signal rolloff of 20%. With further respect to determining satisfactory lowpass filter characteristics, it can be noted that there generally is little or no need to adapt the filter cutoff frequency to the channel Doppler frequency because the filter bandwidth is preferably established at a value substantially higher than the highest expected Doppler frequency.

Figure 8:
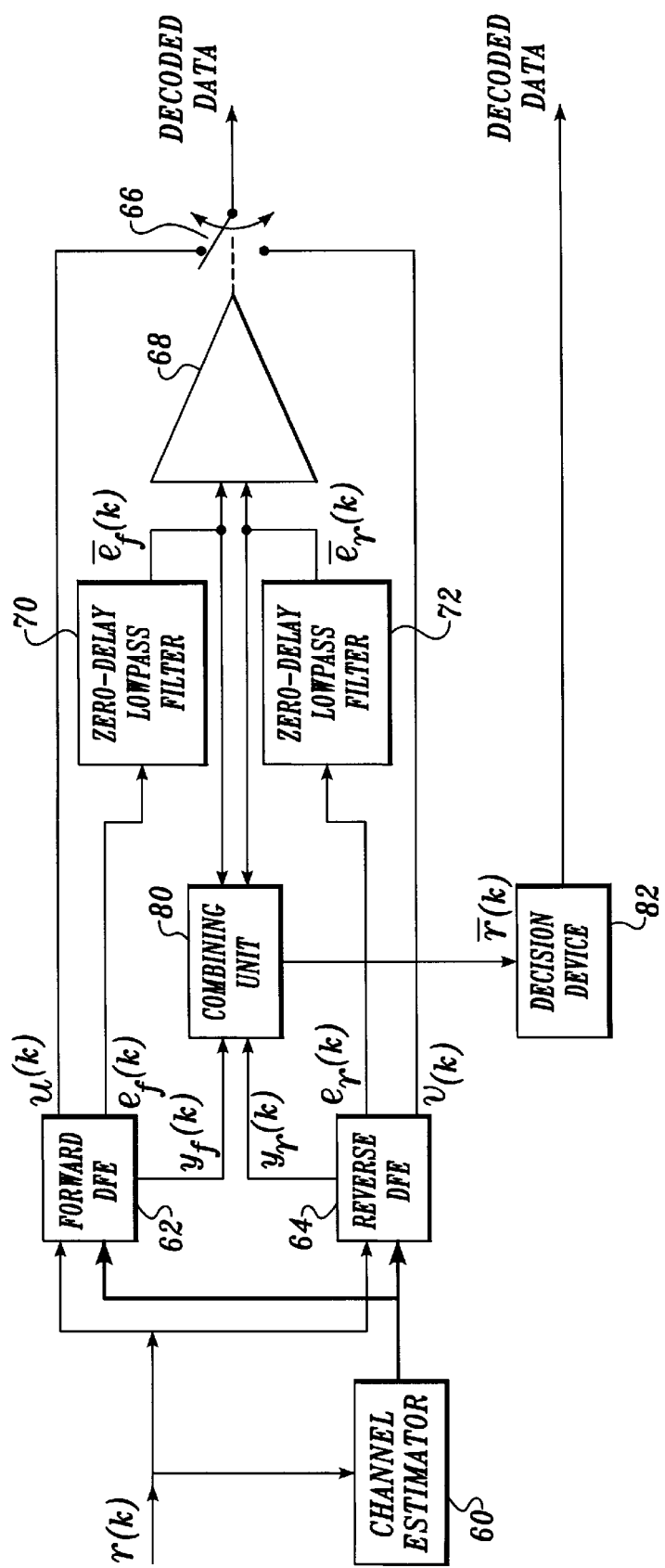
FIG. 8 is a block diagram illustrating the signal processing employed in an alternative embodiment of the invention wherein the decision outputs of the DFE are not utilized. Rather, the pre-decision signals, i.e. the signals just prior to each DFE's decision block, are combined using a weighted average of their points in the complex plane, where the weighting is determined by the relative reliability of the forward and reverse equalizers.

FIG. 8 depicts an alternative embodiment of the invention in which symbol decisions are based on a combination of the reverse and forward equalized signals $y_f(k)$ and $y_r(k)$. Recall, as was described earlier in the discussion of FIG. 5, that the equalized signals $y_f(k)$ and $y_r(k)$ are the complex baseband signals just prior to the equalizers' decisions blocks. These equalized signals are both supplied to a combining unit 80. As also is indicated in FIG. 8, combining unit 80 also is supplied with the lowpass filtered error signals, $\bar{e}_f(k)$ and $\bar{e}_r(k)$, which are respectively supplied by zero delay lowpass filters 70 and 72.

In operation, combining unit 80 forms a weighted average of the forward and reverse equalized signals ($y_f(k)$ and $y_r(k)$) where the weighting is determined from the relative reliability of the forward and reverse DFEs, as indicated by the filtered error signals ($\bar{e}_f(k)$ and $\bar{e}_r(k)$). This weighted average is then considered as a new equalized signal and is supplied to a decision device 82.

Figure 9:
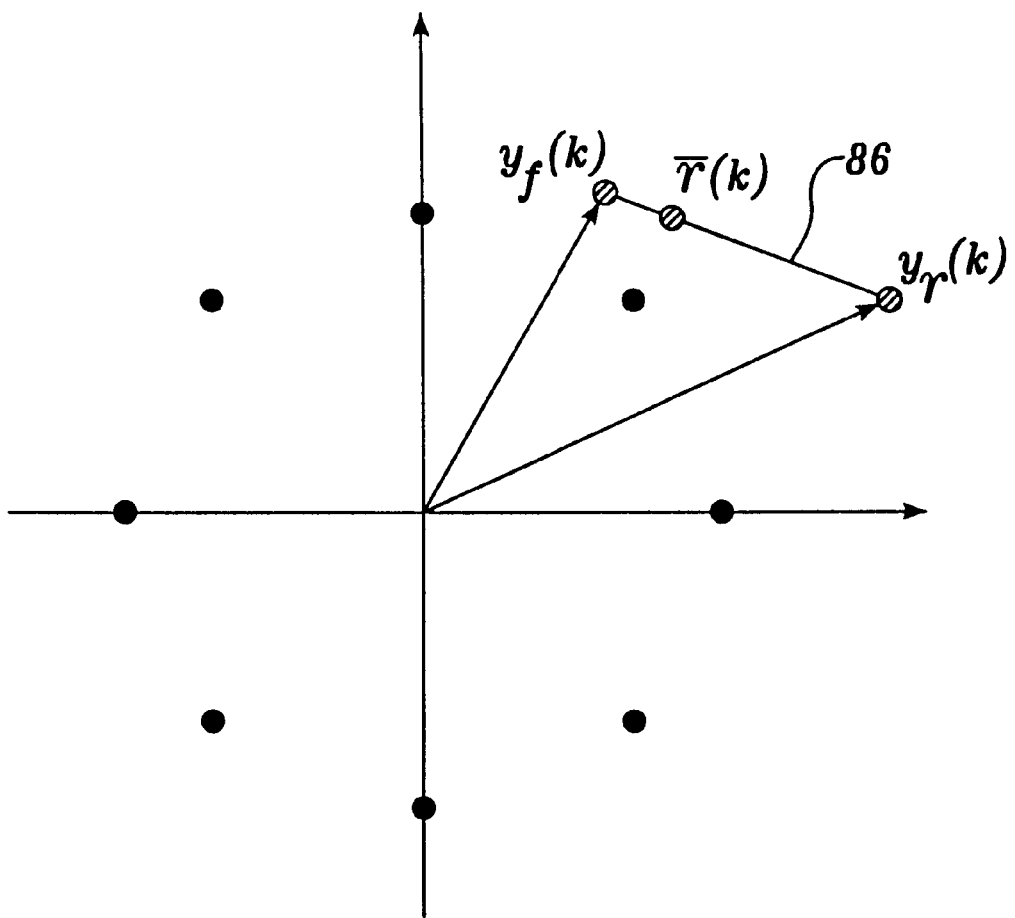
FIG. 9 is a graphical depiction of a symbol signal constellation and symbol estimates that is useful in understanding the operation of the embodiment of the invention that is shown in FIG. 8.

FIG. 9 graphically depicts the weighted averaging that can be utilized in implementing what is designated in FIG. 8 as combining unit 80. Depicted in FIG. 9 are eight geometric points 84 that represent an example signal constellation, namely, that of 8 PSK. Also shown in FIG. 9 is an exemplary forward equalized signal, $y_f(k)$, and an exemplary reverse equalized symbol sample $y_r(k)$. In the situation shown in FIG. 9, the equalized symbol samples of the forward and reverse DFEs 62 and 64 are combined to produce a new equalized signal y'(k) the symbol estimate r(k) in accordance with the following equation:

$$y'(k) = y_f(k) + \left[\frac{\bar{e}_f(k)}{\bar{e}_f(k) + \bar{e}_r(k)}\right](y_r(k) - y_f(k)) \quad (1)$$

With respect to FIG. 9, it can be recognized that equation (1) indicates that y'(k) be positioned on a straight line (86 in FIG. 9) that extends between the forward equalized signal ($y_f(k)$) and the reverse equalized signal ($y_r(k)$). In addition, it can be recognized that the term in square brackets of EQUATION 1, indicates the relative reliability of the forward and reverse equalizers. For example, assuming that the relative reliability term has the value 0.25, corresponding to a case where the forward DFE is more reliable than the reverse DFE, then EQUATION (1) indicates that the new equalized signal will lie at a point that is 0.25 along the line joining ($y_f(k)$) and ($y_r(k)$).

Although the symbols provided by decision device 82 of FIG. 8 can be used as the output of the embodiment shown in FIG. 8, it can be advantageous to select, on a symbol-by-symbol basis, either that output or symbol(s) provided by switch 66 (i.e., the output previously described relative to the arrangement of FIG. 6). The selection is made according to which of the two symbols has the smallest error.

Figure 7:
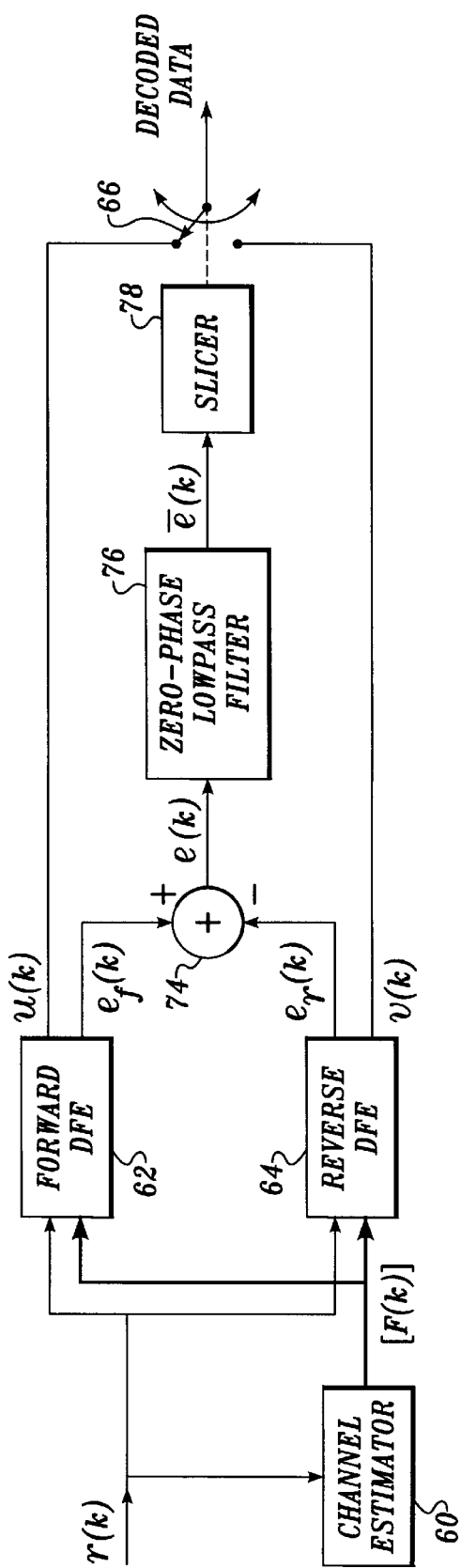
FIG. 7 illustrates a modification of the embodiment shown in FIG. 6 where a single linear lowpass filter is employed. In this embodiment, the difference of the forward and reverse DFE error signals is zero-phase lowpass filtered and the sign of the output determines whether the forward or reverse DFE output is selected.

Various computer simulations have been carried out to compare the operation of the invention with the decision feedback equalization arrangement shown in FIG. 3, and, in addition, to compare the embodiment of the invention shown in FIG. 8 with the embodiments shown in FIGS. 6 and 7. Each of the computer simulations demonstrates that the bit error rates for the various embodiments of the invention are substantially lower than the bit error rates of single direction decision feedback equalizers. With respect to the operating characteristics of embodiments of the invention relative to operation of the bidirectional decision feedback equalizer arrangement of FIG. 3, the embodiments of the invention exhibit a moderate increase in bit error rate that, in many situations, still presents an attractive trade-off in view of the computational simplicity offered. For example, in a simulation of a communication channel for 8 PSK modulation with 0.25% normalized Doppler frequency (e.g., 50 Hz at 20 ksps), 40% pulse rolloff and 0.5 symbol propagation delay, in an two path equal average-energy channel model, an embodiment of the invention exhibited a 0.5 dB loss relative to the type of bidirectional decision feedback equalizer shown in FIG. 3. With pulse rolloff increased to 20%, the difference between the simulated embodiment of the invention and simulated operation of the arrangement of FIG. 3 increased to approximately 1 dB, with both simulations providing substantially all of the performance advantage over operation of a single direction DFE.

A simulation was also conducted for 16 QAM modulation. Approximately a 0.5 dB performance loss was observed in the BER as compared to the arrangement of FIG. 3 occurred with 0.5% normalized Doppler frequency, 40% rolloff and 0.5 symbol propagation delay. With pulse rolloff decreased to 20% and normalized Doppler frequency increased to 0.5%, limitations in the tracking ability of the channel estimator used in the simulation caused a relatively large BER floor at approximately $10^{-2}$. Under those conditions, the simulated embodiment of the invention shown in FIG. 5 exhibited bit error rates approximately 15% above the bit error rates of the bidirectional decision feedback equalizer of FIG. 3. When the same simulation was conducted with a normalized fading rate of 0.25% (e.g., 50 Hz at 20 ksps) the error rates of the simulated embodiment of FIG. 6 were about 50% higher than the error rates of the simulated bidirectional decision feedback equalizer of FIG. 3. However, it is to be noted that even with the increase of bit error rate that occurred in that particular simulation, the bit error rates exhibited by the simulated embodiment of the invention remained substantially below the bit error rates of a single direction DFE and achieved approximately 70% of the reduction in error floor exhibited by the bidirectional decision feedback equalizer of FIG. 3.

Computer simulations were also conducted for the embodiment of the invention shown in FIG. 8. Those computer simulations revealed a modest improvement of BER compared to the embodiments shown in FIGS. 6 and 7.

With respect to the computational complexity of processing the outputs of the forward and reverse DFEs, the embodiment of the invention shown in FIG. 7 where a bidirectional pass of a single-pole IIR lowpass filter is used, four real arithmetic operations are used per data symbol. In a currently contemplated communication system in which each data frame includes 52 data symbols, the result is 208 arithmetic operations per frame. In comparison, operation of the bidirectional decision feedback equalizer of FIG. 3 in the same environment results in approximately 250,000 arithmetic operations per frame. In terms of the required processing instructions per second, the constrained Viterbi algorithm used in FIG. 3 exhibits a peak requirement of 76 MIPS, whereas the embodiment of the invention shown in FIG. 7 requires less than 0.07 MIPS.

The bidirectional decision feedback equalizer of FIG. 3 can be operated in a manner that decreases the required average computational effort required in implementing the equalizer. For example, the average computational effort can be decreased by only processing the forward and reverse DFE outputs with the Viterbi equalizer 38 (or some other maximum likelihood sequence equalizer) when the two sequences of estimated symbols for a data block are not in agreement. In such a variation of the arrangement of FIG. 3, the average computational effort is significantly reduced as long as the receiver employing the bidirectional decision feedback equalizer is operating under favorable channel conditions. For example, it has been estimated that the average computational effort can be reduced to approximately 1/10 of the peak number of computational operations. However, this average complexity is still 100 times larger than the computational complexity of the invention. This substantial difference in computational complexity exists even when the embodiment of the invention shown in FIG. 8 is employed to obtain a modest improvement in bit error rate relative to the embodiments of the invention shown in FIGS. 6 and 7. Specifically, the computational effort resulting from use of the embodiment shown in FIG. 8 is approximately 0.4 MIPS, compared to 0.07 MIPS for the embodiment shown in FIG. 6.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A bidirectional equalizer comprising:
    first and second equalizers, said first and second equalizers receiving and processing the same sequence of digital signal samples, said sequence of digital signal samples being representative of data symbols to be decoded by said bidirectional equalizer, said first equalizer sequentially processing all of said sequence of digital signal samples in a forward direction relative to the time at which digital signal samples of said sequence are received by said bidirectional equalizer to provide a corresponding first sequence of output signals, said second equalizer sequentially processing all of said sequence of digital signal samples in a reverse direction relative to the time at which said digital signal samples of said sequence are received by said bidirectional equalizer to provide a corresponding second sequence of output signals, said first equalizer supplying a first error signal representative of equalizer error for each output signal of said first sequence of output signals, said second equalizer supplying a second error signal representative of equalizer error for each output signal of said second sequence of output signals;
    filter means responsive to and processing said first and second error signals, said filter means exhibiting a lowpass filter function to supply at least one lowpass filtered output signal; and
    signal selection means responsive to said at least one lowpass filtered output signal, said signal selection means operating in synchronism with the first and second sequences of output signals to select an output signal from said first sequence of output signals or from said second sequence of output signals as an output signal of said bidirectional equalizer.

2. The bidirectional equalizer of claim 1, wherein said first and second equalizers are decision feedback equalizers.

3. A bidirectional equalizer comprising:
    first and second equalizers, said first and second equalizers being decision feedback equalizers, said first and second equalizers receiving and processing the same sequence of digital signal samples, said sequence of digital signal samples being representative of data symbols to be decoded by said bidirectional equalizer, said first equalizer sequentially processing said sequence of digital signal samples in a forward direction relative to the time at which digital signal samples of said sequence are received by said bidirectional equalizer to provide a corresponding first sequence of output signals, said second equalizer sequentially processing said sequence of digital signal samples in a reverse direction relative to the time at which said digital signal samples of said sequence are received by said bidirectional equalizer to provide a corresponding second sequence of output signals, said first equalizer supplying a first error signal representative of equalizer error for each output signal of said first sequence of output signals, said second equalizer supplying a second error signal representative of equalizer error for each output signal of said second sequence of output signals;
    filter means responsive to and processing said first and second error signals, said filter means exhibiting a lowpass filter function to supply at least one lowpass filtered output signal; and
    signal selection means responsive to said at least one lowpass filtered output signal, said signal selection means operating in synchronism with the first and second sequences of output signals to select an output signal from said first sequence of output signals or from said second sequence of output signals as the output signal of said bidirectional equalizer;
    wherein said filter means is a linear lowpass filter with a zero-phase response characteristic and wherein said bidirectional equalizer further comprises signal summing means responsive to said first and second error signals for supplying an input error difference signal representative of the difference between said first and second error signals, said difference signal being supplied to said zero-phase lowpass filter, said zero-phase lowpass filter supplying said at least one lowpass filtered output signal that is indicative of said first and second error signals to said signal selection means, said signal selection means including means for selecting the output signal of said first sequence of output signals when said signal supplied by said zero-phase lowpass filter indicates that lowpass filtered content of said first error signal is less than lowpass filtered content of said second error signal and for selecting the output signal of said second sequence of output signals when said signal supplied by said zero-phase lowpass filter indicates that lowpass filtered content of said second error signal is less than lowpass filtered content of said first error signal.

4. The bidirectional equalizer of claim 3, wherein the zero-phase lowpass filter is formed by a bidirectional pass of a single-pole infinite impulse response filter that exhibits a filter function $\bar{e}(k)=a\bar{e}(k-1)+e(k)$, where $e(k)$ represents the input error difference signal supplied by said signal summing means, and $a$ is a real number that is selected to approximately minimize the error rate of said bidirectional equalizer.

5. A bidirectional equalizer comprising:
    first and second equalizers, said first and second equalizers being decision feedback equalizers, said first and second equalizers receiving and processing the same sequence of digital signal samples, said sequence of digital signal samples being representative of data symbols to be decoded by said bidirectional equalizer, said first equalizer sequentially processing said sequence of digital signal samples in a forward direction relative to the time at which digital signal samples of said sequence are received by said bidirectional equalizer to provide a corresponding first sequence of output signals, said second equalizer sequentially processing said sequence of digital signal samples in a reverse direction relative to the time at which said digital signal samples of said sequence are received by said bidirectional equalizer to provide a corresponding second sequence of output signals, said first equalizer supplying a first error signal representative of equalizer error for each output signal of said first sequence of output signals, said second equalizer supplying a second error signal representative of equalizer error for each output signal of said second sequence of output signals;

filter means responsive to and processing said first and second error signals, said filter means exhibiting a lowpass filter function to supply at least one lowpass filtered output signal; and signal selection means responsive to said at least one lowpass filtered output signal, said signal selection means operating in synchronism with the first and second sequences of output signals to select an output signal from said first sequence of output signals or from said second sequence of output signals as the output signal of said bidirectional equalizer;

wherein:

said filter means comprises first and second zero-delay lowpass filters, said first zero-delay lowpass filter receiving and processing said first error signal to supply a first lowpass filtered error signal, said second zero-delay filter receiving and processing said second error signal to supply a second lowpass filtered error signal; and said signal selection means includes a signal comparator responsive to said first and second lowpass filtered error signals, said signal comparator supplying a switch control signal representative of said first and second lowpass filtered error signals, said signal selection means further including switching means responsive to said switch control signal supplied by said signal comparator, said switching means being activated by said switch control signal to supply the output signal of said first sequence of output signals as the output of said bidirectional equalizer when said first filtered error signal is less than said second filtered error signal, said switch signal supplied by said signal comparator activating said switching means to supply the output signal of said second sequence of output signals as the output signal of said bidirectional equalizer when said first filtered error signal exceeds said second filtered error signal.

6. The bidirectional equalizer of claim 5, wherein said first and second equalizers respectively supply first and second equalized signal sequences and wherein said bidirectional equalizer further comprises means for receiving and combining said first and second equalized signal sequences to produce said output signal of said bidirectional equalizer.

7. The bidirectional equalizer of claim 6, wherein said means for receiving and combining said first and second equalized signal sequences includes means for determining a relative reliability term that is based on said first and second lowpass filtered error signals.

8. The bidirectional equalizer of claim 7, wherein said relative reliability term is of the form $\bar{e}_f(k)/(\bar{e}_f(k)+\bar{e}_r(k))$, where $\bar{e}_f(k)$ represents the kth signal of said first lowpass filtered error signal and $\bar{e}_r(k)$ represents the kth signal of said second lowpass filtered error signal.

9. The bidirectional equalizer of claim 8, wherein said means for receiving and combining said first and second equalized signal sequences produces an equalized signal of the form $$y'(k) = y_f(k) + \left[\frac{\bar{e}_f(k)}{\bar{e}_r(k) + \bar{e}_f(k)}\right](y_r(k) - y_f(k))$$

where $y'(k)$ and $y_r(k)$ respectively represent the kth signals of said first and second sequences of equalized output signals that are supplied by said first and second decision feedback equalizers.

10. A bidirectional equalizer comprising:

first and second equalizers, said first and second equalizers receiving and processing the same sequence of digital signal samples, said sequence of digital signal samples being representative of data symbols to be decoded by said bidirectional equalizer, said first equalizer sequentially processing all of said sequence of digital signal samples in a forward direction to the time at which digital signal samples of said sequence are received by said bidirectional equalizer to provide a corresponding first sequence of equalized signals and a corresponding first sequence of output signals, said second equalizer sequentially processing all of said sequence of digital signal samples in a reverse direction relative to the time at which said digital signal samples of said sequence are received by said bidirectional equalizer to provide a corresponding second sequence of equalized signals, and a corresponding second sequence of output signals, said first equalizer supplying a first error signal representative of a difference between each output signal and the corresponding equalized signal of said first sequence of output signals, said second equalizer supplying a second error signal representative of a difference between each output signal and the corresponding equalized signal of said second sequence of output signals;

first and second zero-delay lowpass filters, said first zero-delay lowpass filter receiving and processing said first error signal to supply a first lowpass filtered error signal, said second zero-delay filter receiving and processing said second error signal to supply a second lowpass filtered error signal, and signal combining means for receiving and processing said first and second sequences of equalized signals and said first and second lowpass filtered error signals, said signal combining means producing a sequence of equalized signal that is the weighted average of said first and second equalized signals.

11. The bidirectional equalizer of claim 10, wherein said signal combining means includes means for determining a relative reliability term that is based on said first and second lowpass filtered error signals and wherein said relative reliability term determines said weighted average of said first and second sequence of equalized signals.

12. A bidirectional equalizer comprising:

first and second equalizers, said first and second equalizers receiving and processing the same sequence of digital signal samples, said sequence of digital signal samples being representative of data symbols to be decoded by said bidirectional equalizer, said first equalizer sequentially processing said sequence of digital signal samples in a forward direction to the time at which digital signal samples of said sequence are received by said bidirectional equalizer to provide a corresponding first sequence of equalized signals and a corresponding first sequence of output signals, said second equalizer sequentially processing said sequence of digital signal samples in a reverse direction relative to the time at which said digital signal samples of said sequence are received by said bidirectional equalizer to provide a corresponding second sequence of equalized signals, and a corresponding second sequence of output signals, said first equalizer supplying a first error signal representative of a difference between each output signal and the corresponding equalized signal of said first sequence of output signals, said second equalizer supplying a second error signal representative of a difference between each output signal and the corresponding equalized signal of said second sequence of output signals;

first and second zero-delay lowpass filters, said first zero-delay lowpass filter receiving and processing said first error signal to supply a first lowpass filtered error signal, said second zero-delay filter receiving and processing said second error signal to supply a second lowpass filtered error signal, and signal combining means for receiving and processing said first and second sequences of equalized signals and said first and second lowpass filtered error signals, said signal combining means producing an equalized signal that is the weighted average of said first and second sequence of equalized signals;

wherein said signal combining means includes means for determining a relative reliability term that is based on said first and second lowpass filtered error signals and wherein said relative reliability term determines said weighted average of said first and second sequence of equalized signals, wherein said relative reliability term is of the form $\bar{e}_f(k)/(\bar{e}_f(k)+\bar{e}_r(k))$, where $\bar{e}_f(k)$ represents the kth signal of said first lowpass filtered error signals and $\bar{e}_r(k)$ represents the kth signal of said second lowpass filtered error signals.

13. The bidirectional equalizer of claim 12, wherein said means for receiving and combining said first and second equalized output signal sequences produces an equalized signal of the form $$y'(k) = y_f(k) + \left[\frac{\bar{e}_f(k)}{\bar{e}_r(k)+\bar{e}_f(k)}\right](y_r(k) - y_f(k))$$

where y'(k) and $y_r(k)$ respectively represent the kth signals of said first and second sequences of equalized output signals that are supplied by said first and second equalizers.

14. A method for bidirectional equalization of a received sequence of digital signal samples comprising the steps of:
sequentially processing all of said sequence of digital signal samples in a forward time direction to supply a first sequence of output signals and a corresponding first sequence of equalization error signals;
sequentially processing all of said received sequence of digital sequence samples in a reverse time direction to supply a second sequence of output signals and a corresponding second sequence of equalization error signals;
lowpass filtering said first and second sequence of error signals to supply at least one lowpass filtered estimated error signal;
generating an estimated reliability signal based upon said at least one lowpass filtered estimated error signal;

selecting for output of said bidirectional equalization method the first sequence of output signals or the second sequence of output signals, with said step of selecting being based upon said estimated reliability signal.

15. The method of claim 14, wherein said step of lowpass filtering said sequence of said first and second equalization error signals includes the steps of combining said first and second equalization error signals to produce a difference signal and filtering said difference signal with a zero-phase lowpass filter function.

16. A method for bidirectional equalization of a received sequence of digital signal samples comprising the steps of:
sequentially processing said sequence of digital signal samples in a forward time direction to supply a first sequence of output signals and a corresponding first sequence of equalization error signals;
sequentially processing said received sequence of digital sequence samples in a reverse time direction to supply a second sequence of output signals and a corresponding second sequence of equalization error signals;
lowpass filtering said first and second sequence of error signals to supply at least one lowpass filtered estimated error signal;
generating an estimated reliability signal based upon said at least one lowpass filtered estimated error signal;
selecting for output of said bidirectional equalization method the first sequence of output signals or the second sequence of output signals, with said step of selecting being based upon said estimated reliability signal;
wherein said step of lowpass filtering includes the steps of separately filtering said first and second equalization error signals to provide first and second lowpass filtered estimated error signals; comparing said first and second lowpass filtered estimated error signals; selecting the output signal of said first sequence of output signals when said first lowpass filtered estimated error signal is less than said second lowpass filtered estimated error signal; and, selecting the output signal of said second sequence of output signals when said first lowpass filtered estimated error signal is greater than said second lowpass filtered estimated error signal.

17. The bidirectional equalization method of claim 16, wherein the step of sequentially processing said received sequence of digital signal samples in the forward time direction includes the step of supplying a first sequence of equalized signal samples; said step of sequentially processing said sequence of received signal samples in the reverse time direction includes the step of supplying a second sequence of equalized signal samples; and said method further comprises the step of combining corresponding pairs of equalized signal samples from said first sequence of equalized signal samples and said second sequence of equalized signal samples to produce a single equalized signal sample for each digital signal sample of said received sequence of digital signal samples.

* * * * *